United States Patent [19]

Wentworth

[11] E Patent Number: Re. 32,646

[45] Reissued Date of Patent: Apr. 19, 1988

[54] MECHANICAL SEALS WITH SETTING BLOCK FOR USE WITH SLURRY PUMPS

[75] Inventor: Robert S. Wentworth, Temecula, Calif.

[73] Assignee: Borg-Warner Corporation, Chicago, Ill.

[21] Appl. No.: 777,481

[22] Filed: Sep. 18, 1985

Related U.S. Patent Documents

Reissue of:

[64] Patent No.: 4,418,919
Issued: Dec. 6, 1983
Appl. No.: 471,093
Filed: Mar. 1, 1983

[51] Int. Cl.[4] ..... F16J 15/34

[52] U.S. Cl. ..... 277/40; 277/81 R; 277/85; 277/92

[58] Field of Search ..... 277/65, 82, 84, 92, 277/95, 88–90, 38–43, 81 R, 85, 93 R

[56] References Cited

U.S. PATENT DOCUMENTS

| | | | |
|---|---|---|---|
| 2,279,669 | 4/1942 | Friskney | 277/40 |
| 2,508,097 | 5/1950 | Brown | 277/90 X |
| 2,752,176 | 6/1956 | Ayling | 277/89 X |
| 2,863,680 | 12/1958 | Taltavall | 277/88 X |
| 2,871,039 | 1/1959 | Payne | 277/40 X |
| 2,871,040 | 1/1959 | Payne | 277/41 |
| 2,985,475 | 5/1961 | Peickü et al. | 277/38 |
| 3,018,112 | 1/1962 | Amirault et al. | 277/90 X |
| 3,185,488 | 5/1965 | Christensen et al. | 277/42 |
| 3,272,519 | 9/1966 | Voitik . | |
| 3,291,493 | 12/1966 | Blair . | |
| 3,336,660 | 8/1967 | Christensen et al. . | |
| 3,392,984 | 7/1968 | Reinsma et al. . | |
| 3,452,994 | 7/1969 | Gyory . | |
| 4,266,786 | 5/1981 | Wiese | 277/65 X |
| 4,306,727 | 12/1981 | Deane et al. . | |

FOREIGN PATENT DOCUMENTS

| | | | |
|---|---|---|---|
| 632530 | 11/1949 | United Kingdom | 277/89 |
| 641560 | 8/1950 | United Kingdom | 277/92 |
| 734794 | 8/1955 | United Kingdom | 277/92 |
| 1278599 | 6/1972 | United Kingdom | 277/84 |
| 2007776 | 5/1979 | United Kingdom . | |
| 2019956 | 11/1979 | United Kingdom . | |

*Primary Examiner*—Robert S. Ward
*Attorney, Agent, or Firm*—Aubrey L. Burgess

[57] ABSTRACT

A mechanical seal assembly, especially for use in a slurry pump in which the seal rings are resiliently urged into sealing relation by at least one elastomeric assembly loaded in shear. The preferred embodiment is constructed as a carriage for installation and removal as a unit but it may also be constructed for installation in situ.

13 Claims, 3 Drawing Sheets

MECHANICAL SEALS WITH SETTING BLOCK FOR USE WITH SLURRY PUMPS

Matter enclosed in heavy brackets [ ] appears in the original patent but forms no part of this reissue specification; matter printed in italics indicates the additions made by reissue.

BACKGROUND OF THE INVENTION

The conventional mechanical seal used between a motor and a product pump comprises a stationary seal ring connected to the motor housing and a rotatable seal ring connected to the motor shaft, each seal ring having a lapped seal face opposing the seal face on the other ring. Resilient means such as coil springs and/or bellows urge one seal ring face toward the other in sealing relation.

In order to facilitate the installation and removal of such seals, it is common to assemble the seal in a so-called "cartridge," such as by mounting a pre-assembled seal on a cylindrical sleeve which is slipped on the [O.D.] *outer diameter (O.D.)* of the motor shaft and secured thereto by one or more set-screws.

Most mechanical seals of the type described above have a number of metal parts, such as bellows and springs, which bias the seal rings in sealing relation, and are exposed to the product fluid. In applications where the product fluid is non-abrading and non-corrosive, this does not present a problem; but in slurry pumps, the abrasive action of the pump fluid attacks the metal parts and greatly reduces service life.

While the typical mechanical seal is compact and is charcterized by closely fitting, precision made parts, it is desirable to provide slurry pump seals with rather crude parts which can be manufactured with larger dimensional tolerances and therefore at lower cost, because they wear out more quickly despite efforts to extend operating life. This also affects the manner in which they have to be mounted in the pump. For instance, as mentioned above, most cartridge seals are secured with a number of set screws which often become frozen and require a tedious, time-consuming operation to free up. In dealing with slurry pump seals, which are adjusted and replaced more often, it is important to provide a quick and uncomplicated means for securing and removing the seal from the shaft.

Still another consideration in the design of slurry pumps seals is in the area of loading the seal rings. There are examples of seals in the prior art where the springs have been replaced by an elastomeric material to provide the necessary "spring" to keep the seal rings in sealing relation.

Elastomers can be stressed in torsion, compression, tension and shear. The latter is the most advantageous because the stresses are spread, generally uniformly, throughout the mass of the elastomers. When stressed in torsion, the stresses are primarily in the outer fibers with the interior generally unstressed and it is these fibers which are the first to be lost through abrasion or chemical attack. Further, an elastomer stressed in torsion quickly loses its spring function. When placed in tension, elastomers take on the permanent set of the stressed material, as for example, a stretched rubber band becomes permanently elongated. If an elastomer body is confined, it is incompressible. If not confined and subject to compression, it will bulge; moreover, it will have a high spring rate with little travel, so it is not suitable for substitution as a spring.

For example, Deane et al, in U.S. Pat. No. 4,306,727, teach the use of a static elastomeric ring abutting a metal seal ring in a drill bit environment and discloses, in the background, that elastomeric seals are used between the rotating cutters and the bearing journals to prevent intrusion of dirt, sand, rock cuttings, corrosive liquids and other contaminants into the bearing area. Although the elastomeric ring of Deane et al does show the use of an elastomer to urge one seal ring toward one another, it is constructed in such a manner that debris tends to collect on the leakage side which could cause deterioration of the elastomer and be difficult to clean out except by disassembly of the seal mechanism.

In Voitek, U.S. Pat. No. 3,272,519, seals for use between the rear wheels of a tractor and a tractor frame are described. Each uses a pair of elastomeric, "rounded square" cross-sectioned, sealing elements which urge a pair of seal rings toward one another and which, during use, are stressed and deform to a diamond shape, leaving crevices at the concave grooves into which the elastomeric members are received to collect debris.

Neither Deane et al nor Voitek disclose or suggest the concept of loading the elastomeric element in shear.

SUMMARY OF THE INVENTION

The mechanical seal of this invention is especially constructed for use with abrasive slurry pumps and comprises the customary stationary and rotatable seal rings, each having a seal face in juxtaposed relation. The seal rings are resiliently urged in sealing relation by at least one elastomeric assembly which is resistant to abrasive and corrosive attack by the pump product.

The elastomeric assembly comprises an annular ring member which is bonded to a pair of generally coaxially oriented, but axially and radially spaced, metal bands, so that when the bands are axially moved toward one another as the seal is assembled in place, the ring member is loaded in shear, viz., parts of the elastomeric material will tend to slide relative to each other in a direction parallel to the axis of the bands.

In one form of the invention, one elastomeric assembly is used; and in another form of the invention, a pair of elastomeric assemblies are used. In both forms of the invention, an elastomeric cylinder [connects the rotatable sealring to the shaft of the motor driving the slurry pump, so that the rotatable seal ring rotates with the shaft] *, cooperating with at least one sleeve encircling the shaft, is arranged behind at least one seal in a supporting manner and provides a biasing force between the seal faces of the rings.* The elastomeric portion of the assembly forms a barrier against the flow of pump products to the shaft and protects many metal parts of the assembly from abrasion by the pump product. In the two assembly form of the invention, [the stationary seal ring is connected to the housing by the second elastomeric assembly] *both seal rings may be supported by independently arranged elastomeric assemblies.*

The seal of this invention is preferably a cartridge which can be installed and removed from the shaft as a unit. As such, the seal assembly includes a cylindrical sleeve adapted to be locked to the motor shaft by a wedge arrangement which can be easily removed when the seal assembly is being replaced even when leakage deposits are present. The wedge can be driven from its locking position by hammer blows on a driver rod or the like.

The seal assembly of the present invention provides clearances between parts which are greater than those in conventional seal assemblies, permitting leakage deposits to be removed from the assembly more easily. The seal rings are also provided with elastomeric shields to protect drive notches which receive drive pins, as will be later explained, and to armor the rings to protect their relatively brittle faces during handling and use.

The seal assemblies are preferably preassembled as cartridges, each with a predetermined spring load (provided by an elastomeric assembly loaded in shear) and are provided with novel locating elements, so as to facilitate their installation into a pump-motor combination. The locating elements also serve as flange clamps when the seals are operational.

DETAILED DESCRIPTION OF THE PREFERRED EMBODIMENT

Figures 1, 8:
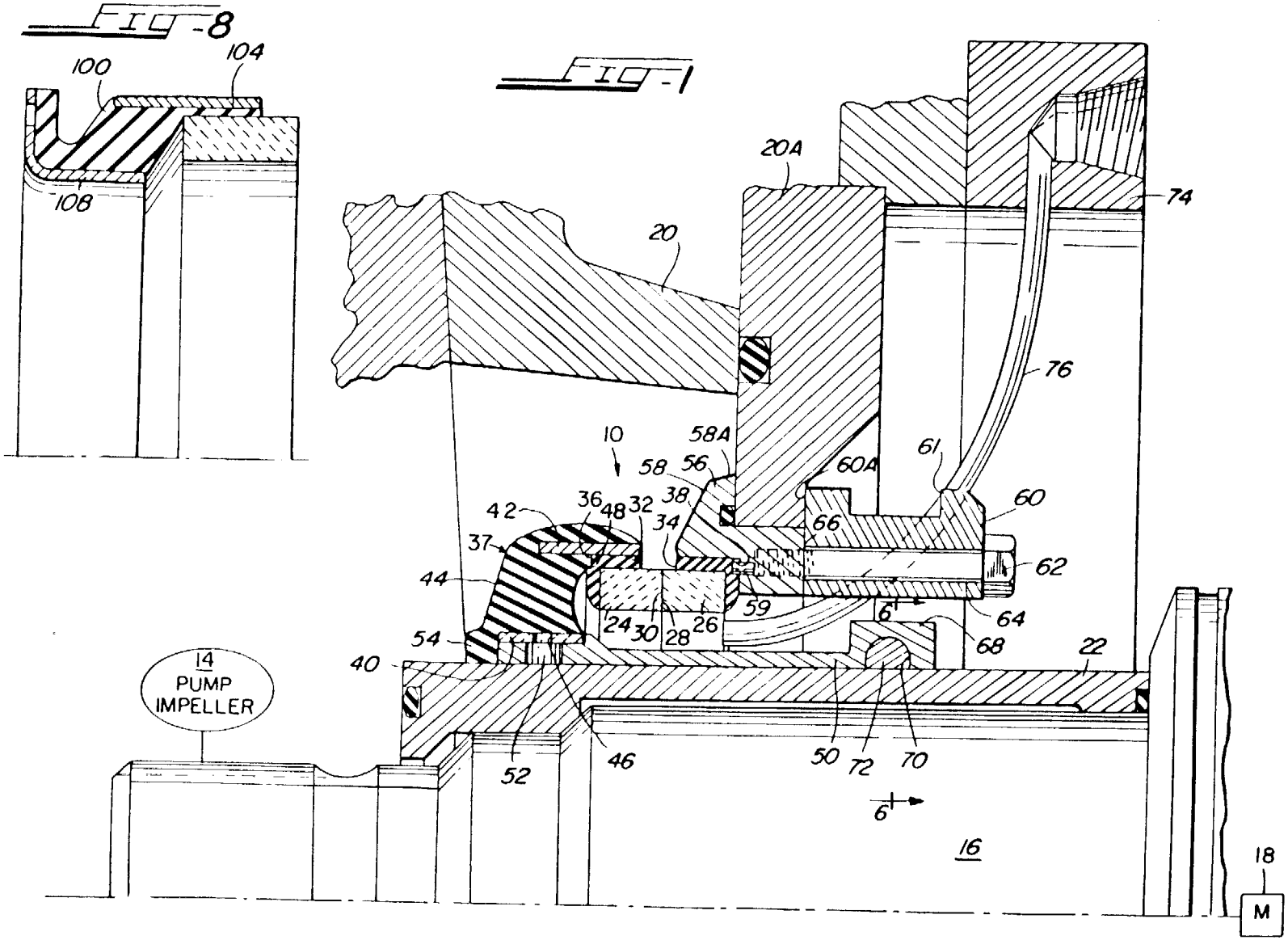
FIG. 1 is a partial cross-sectional view of a preferred embodiment of the mechanical seal assembly of this invention.
FIG. 8 is a partial cross-sectional view of an elastomeric assembly for the FIG. 7 embodiment before the elastomer is stressed.

FIG. 1 illustrates a preferred embodiment of the invention which comprises a mechanical seal assembly 10 associated with a slurry pump having an impeller 14 (shown schematically) driven by a shaft 16 of a motor schematically shown at 18. The seal assembly 10 is enclosed in a housing 20, and is in the form of a cartridge which is installed in and removed from the shaft 16 as a unit. In the embodiment illustrated in FIG. 1, the assembly 10 is associated with a packing sleeve 22 which encircles the shaft 16 and which protects the shaft 16 from pump product, and abrasive slurry.

The mechanical seal cartridge or assembly 10 comprises rotatable seal ring 24 and stationary seal ring 26, each having a seal face 28 and 30, respectively, in opposed relation and resiliently urged toward one another *in sealing relationship for retarding the flow of pump product from a high pressure region to a low pressure region extending along the shaft.* Seal rings 24 and 26, which, in the preferred embodiment, are substantially identical in form and material, are preferably constructed of a ceramic, such as an aluminum oxide, and are provided with partial, corner covering shields 32 and 34 of an elastomeric material bonded thereto, such as a rubber of a Shore hardness of about 50 to 60. The elastomeric shields are provided with circumferentially spaced driving grooves 36 spaced about 90° apart; it being understood that other spacings can be used if desired.

Figure 2:
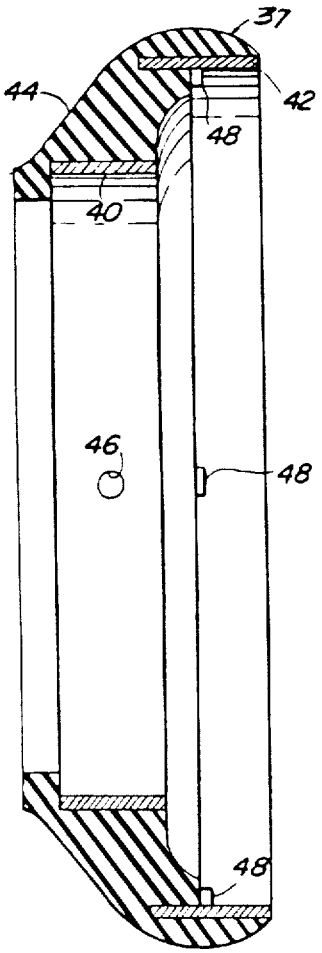
FIG. 2 is a cross-sectional view of the elastomeric assembly before the elastomer is stressed.

Seal cartridge 10 also includes an elastomer assembly, designated generally at 37 (see FIGS. 1 and 2) constructed of an annular core of elastomeric material 44, such as a rubber with a Shore hardness of about 50 to 60, bonded to a pair of generally concentric, but axially and radially spaced bands 40 and 42, preferably of stainless steel. The inner band 40 is provided with circumferentially spaced holes 46, generally spaced about 90° apart, and member 44 of elastomeric material is formed with circumferentially spaced lugs 48 of a shape, size and spacing to engage driving grooves 36 in the shield 32 on seal ring 24. Band 42 circumferentially surrounds seal ring 24, and overlies and is in contact with shield 32. [Band 40 is connected to a cylindrical shaft sleeve 50 by means of drive pins 52 each having a portion received in one of the holes 46 in band 40] *Mechanical securement means are provided for detachably securing the elastomeric assembly to an attachment region within the pump. That is, band 40 is releasably connected to a cylindrical shaft sleeve 50 by means of drive pins 52. Each pin 52 has a portion thereof received in one of the holes 46 of the band 40 thereby preventing displacement of the elastomeric assembly when pressure, created within the pump by reason of impeller action, acts thereon. By this construction, a static seal, capable of withstanding high pressure, is maintained between the elastomeric assembly and the attachment region within the pump thereby preventing secondary leakage therepast.*

As pointed out above in the section headed "Background of the Invention", it is an important aspect of the present invention to insure that the elastomeric assembly is loaded in shear so that the stresses are uniform over substantially the entire cross-section of the element. The bands 40 and 42 act as reinforcing elements which, because of their location and orientation, will cause the annular elastomeric body to be in shear as the two seal rings are moved toward each other. As best shown in FIG. 1, as the bias is put into seal ring 24, the outer band will want to slide to the left above and over band 40. This places the annular elastomeric body 44 in shear over substantially the entire cross-sectional area between the two bands.

Seal ring 26 is supported by flange member 56 formed with a bull-nose portion 58 overlying and closely surrounding ring 26 and shield 34. Circumferentially spaced drive pins 59 supported by flange member 56 engage the driving grooves 36 in the shield 34. Bullnose portion 58 of flange 56 is preferably coated, as at 58A, with an elastomeric material to protect flange nose 58 from being attacked by the pump product. This coating is preferably a rubber of a Shore hardness of 50 to 60.

Flange 56 is clamped on housing flange 20A by means of at least three circumferentially spaced setting blocks 60, each having a notch 61. Machine bolts 62 pass through corresponding bolt holes 64 in the setting blocks and into a threaded opening 66 in flange 56.

Figure 6:
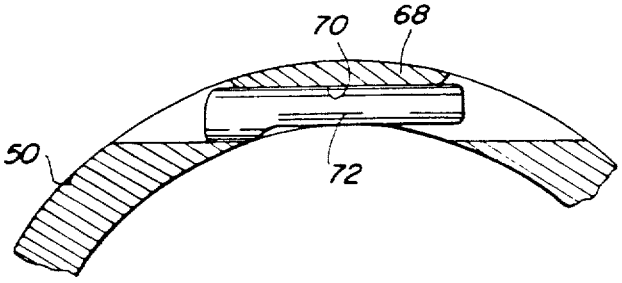
FIG. 6 is a partial cross-sectional view taken on line 6—6 of FIG. 1 illustrating the locking wedge for connecting the mechanical seal assembly of this invention to a shaft.

To permit the installation and removal of the seal as a unit, all of the major components are mounted on a sleeve 50 which can be slipped onto the O.D. of [shaft] *sleeve* 22. [Shaft sleeve] *Sleeve* 50 is formed with sleeve flange 68 at its end opposite to the location of ring 38 and is drilled, see FIG. 6, with a hole 70 to receive locking wedge 72, which, when driven into the hole, wedges sleeve 50 and mechanical seal assembly 10 to packing sleeve 22.

Figure 3:
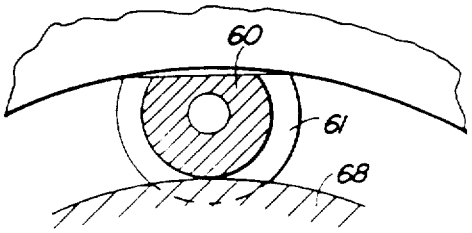
FIGS. 3, 4 and 5 are partial cross-sectional views showing various positions of a cartridge setting block, each being identified by appropriate indicia.
Figure 5:
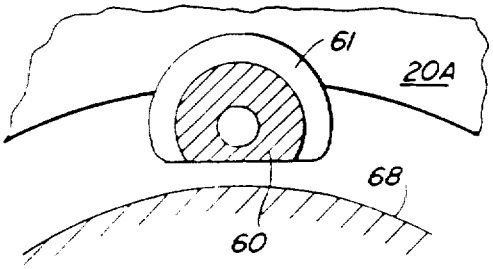
Figure 1A:
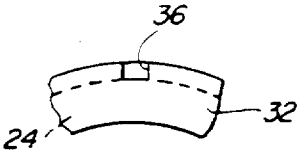
FIG. 1A is a partial elevational view showing a driving groove in one of the seal rings into which a drive lug of an elastomeric assembly is received.

Seal cartridge 10 is inserted into its operating position from the pump end of the shaft 16 before impeller 14 is connected thereto; the spacing of its parts is adjusted prior to installation. The cartridge 10 is assembled as follows:

(a) seal ring 24 is set into the elastomer assembly 37 with drive grooves 36 aligned with drive lugs 48;

(b) seal ring 26 is set into flange 56;

(c) elastomer assembly 37 with seal ring 24 is slipped onto the left end of sleeve 50 and secured by pins 52 which may be temporarily taped into place;

(d) three setting blocks 60 are fastened to flange 56 and bolts 62 finger tightened to hold the setting blocks in the "running" position (FIG. 5);

(e) The flange/setting block/stationary seal ring assembly is then slipped over the right-hand end of shaft sleeve 50 and the setting blocks are then turned 180° to the "insert" [portion] *position* (FIG. 3) so that sleeve flange 68 is captured by the notch 61 in the setting block.

Figure 4:
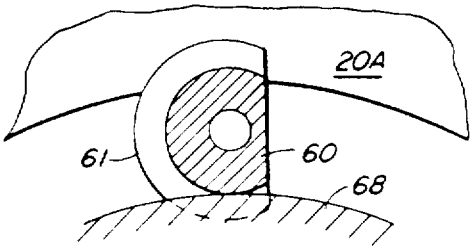

The assembled cartridge 10 is now ready for installation in its operating location. Because the elastomer assembly 37 associated with seal ring 24 is (as shown in FIG. 1) in shear, it resiliently urges seal ring 24 toward seal ring 26. Cartridge 10 is slipped onto the left end of packing sleeve 22 and as the drive pins 52 reach the left end of the packing sleeve 22, the tape is removed so that the pins are held in place by the O.D. of the sleeve. Flange 56 is seated against the face of mounting flange 20A; the setting blocks are then rotated to the "shaft adjusting position" (FIG. 4) and bolts 62 are tightened.

At this time the pump assembly is completed and all necessary adjustments made in respect to the shaft; and then the shaft sleeve is locked to the shaft by insertion of pin 72 which is driven home until seated. Bolts 62 are then loosened, the setting blocks rotated to the "running" position and bolts retightened.

Elastomer assembly 37, because of its shape, has no crevices into which residue from pump product can collect. Also the shear stresses in the elastomer are spread uniformly throughout the elastomeric material. Elastomer assembly 37 not only supports seal ring 24 but also provides a hydraulic seal between sleeve 50 and seal ring 24 and protects at least a portion of sleeve 50 from the pump product.

Figure 7:
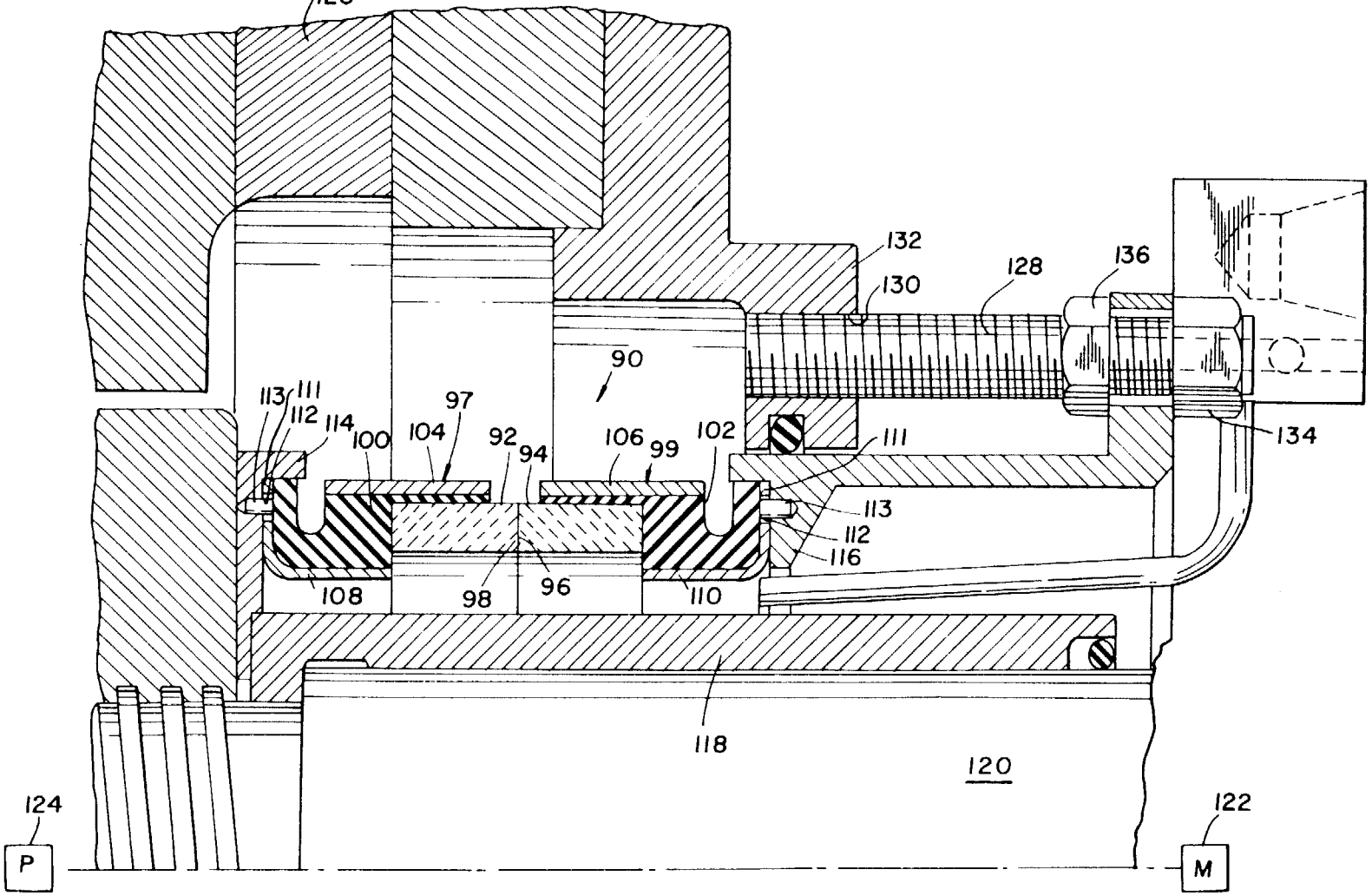
FIG. 7 is a partial cross-sectional view of a second embodiment of this invention.

FIG. 7 illustrates a second embodiment of the invention which is adapted to be assembled on a shaft sleeve in situ, i.e., not a cartridge type seal. This embodiment is especially adaptable for modifying a standard pump wherein a pump can be retrofitted with the seal assembly instead of a conventional stuffing box. Mechanical seal assembly 90 comprises rotatable seal ring 92 and stationary seal ring 94, the rings having seal faces 96 and 98, respectively, opposing and resiliently urged toward one another. Seal rings 92, 94 are urged toward one another by elastomeric assemblies 97, 99, the elastomer of each assembly core 100, 102 being preferably a rubber having a Shore hardness of 50 to 60. Each assembly core 100, 102 is bonded to an outer metal band 104, 106 and a cup-like ring part 108 or 110. The bands 104, 106 and cup-like ring parts 108–110 are preferably made of stainless steel. The shape of one of the elastomeric assemblies, as manufactured, is shown in FIG. 8, it being understood that both cores 100 and 102 are substantially identical. When the rings 104 and 108 are moved axially toward each other during assembly of the seal, the elastomeric cores 100 and 102 are loaded in shear, and this provides the spring force to urge the rings 92 and 94 toward one another. Band 104 overlies seal ring 92, while band 106 overlies seal ring 94. [Each cup-like part 108 and 110 is provided with circumferentially spaced holes 112 to each receive a drive pin 113 supported by positioning ring 114 at one end and adapter sleeve 16 at the other end] *As in the other embodiment, mechanical securement means are provided for detachably securing each elastomeric assembly to an attachment region within the pump. Since the securement means are similar on each elastomeric assembly, like reference numerals indicate like parts on each assembly. Each cup like part 108 and 110 is provided with a radial flange portion 111 having circumferentially spaced holes 112 disposed thereabout. When the elastomer assembly is disposed in its assembled state within the pump, the flange portion 111 abuts an attachment region within the pump, with the holes 112 fitting over the free end of drive pins which are supported by structure within the pump. By such construction, a static seal, capable of withstanding high pressure, is maintained between the elastomeric assembly and structure within the pump thereby preventing secondary leakage past the mounting end of the elastomeric assembly.* The seal assembly is associated with packing sleeve 118, and positioning ring 114 is provided with a circular cavity, so as to receive sleeve [18] *118*. Sleeve [18] *118* is adapted to be assembled over shaft 120 connecting motor 122 and pump impeller 124. Impeller 124 is housed in housing 126. Adapter sleeve 116 is connected to housing 126 by at least one and usually several circumferentially spaced machine bolts 128 which are received in tapped openings 130 in flange 132 of housing 126. Nuts 134 and 136 permit adjustment of flange 116 and also function to move bands 104, 106 relative to the axially extending portions of members 108 and 110 to stress cores 100 and 102 in shear, so that they urge seal rings 92 and 94 toward one another.

While this invention has been described in connection with certain specific embodiments thereof, it is understood that various modifications may be made without departing from the spirit of the invention.

What is claimed is:

1. A mechanical seal assembly [especially] adapted for use with pumps [whose pump product is abrasive and which is operatively associated with] *which includes* a pump housing *having an attachment region* and a [motor-drive] shaft *for* driving a pump impeller, said seal *assembly* comprising:

a rotatable seal ring operatively connected to and driven with said shaft;

a stationary seal ring operatively connected to said housing, each of said seal rings having a face opposing the face of the other seal ring and adapted to cooperate in sealing relation therewith[;] *for retarding the flow of pump product from a high pressure region to a low pressure region extending along the shaft; and* an elastomeric assembly supporting *one of* said [rotatable] seal [ring] *rings*, said elastomeric assembly including an annular member formed of elastomeric material, [and] a pair of concentric bands bonded thereto, *at least one of said bands having an axially extending annular surface free of elastomeric material*, said bands being axially and radially spaced from each other, *and means for detachably securing said free band surface and thus said elastomeric assembly to the attachment region within the pump in a manner whereby a static seal capable of withstanding high pressure is maintained between* said elastomeric assembly [,] *and said region to prevent secondary leakage therebetween and such that* when [placed] *arranged* in an operative position [on said drive shaft, urging said rotatable] *the elastomeric assembly urges said one* seal ring toward [said stationary] *the other of said* seal [ring] *rings* and [being] *is* loaded in shear in the zone between said bands.

2. A seal assembly as defined in claim 1 including a second elastomeric assembly supporting said [stationary] *other* seal ring, both said first and second elastomeric assemblies including an outer band and an inner band bonded to a core of elastomeric material.

3. A seal assembly as defined in claim 1 wherein *at least one of* said seal rings [are] *is* covered, in part, by a shield of elastomeric material to protect said [rings] *ring* from an abrasive pump product.

4. A seal assembly as defined in claim 1 wherein each [said] seal ring is constructed of a ceramic material.

5. A seal assembly as defined in claim 1 wherein said elastomeric assembly is provided with drive lugs cooperating with corresponding driving grooves associated with *one of* said seal [ring] *rings.*

6. A seal assembly as defined in claim 5 wherein said seal ring is provided with an elastomeric shield over a portion of its surface and said driving grooves are formed in said shield.

7. A cartridge-type mechanical seal comprising: a shaft sleeve adapted to be carried on the O.D. of a pump impeller shaft;

a first rotatable seal ring mounted on said sleeve;

a second, stationary seal ring supportable by said sleeve during installation and adjustment thereof, said second seal ring being carried by an annular flange which is adapted to engage a stationary element; and a setting block attached to said annular flange and having a surface engageable with said stationary element to clamp said element between said flange and said setting block.

8. A seal as defined in claim 7 wherein said setting block is rotatable to three positions: (1) an insertion position in which the setting block engages only said shaft sleeve; (2) an adjustment position in which the setting block engages both said shaft sleeve and said stationary element; and (3) a running position in which the setting block engages only said stationary element.

9. A seal as defined in claim 7 wherein said shaft sleeve is attached to the motor shaft by means of a wedge element extending through an opening in said shaft sleeve.

10. A seal as defined in claim 7 wherein said first seal ring is biased by means of an elastomeric assembly [adapted to be] loaded in shear.

11. A seal assembly as defined in claim 10 wherein said first seal ring is protected by a shield of elastomeric material over a portion of its surface.

*12. A seal assembly as defined in claim 1 wherein said one seal ring is the stationary seal ring.*

*13. A seal assembly as defined in claim 1 wherein the means for detachably securing the elastomeric assembly comprises a flanged extension provided on one of said bands and which is releasably secured, in a sealant manner, to said pump housing.*

* * * * *